(12) United States Patent
Peter et al.

(10) Patent No.: US 7,816,921 B2
(45) Date of Patent: Oct. 19, 2010

(54) RESISTIVITY TOOLS WITH LOAD-BEARING AZIMUTHALLY SENSITIVE ANTENNAS AND METHODS OF USING SAME

(75) Inventors: Andreas Peter, Celle (DE); Martin Blanz, Celle (DE)

(73) Assignee: Baker Hughes Incorporated, Houston, TX (US)

( * ) Notice: Subject to any disclaimer, the term of this patent is extended or adjusted under 35 U.S.C. 154(b) by 281 days.

(21) Appl. No.: 11/854,979

(22) Filed: Sep. 13, 2007

(65) Prior Publication Data

US 2008/0068023 A1   Mar. 20, 2008

Related U.S. Application Data

(60) Provisional application No. 60/845,926, filed on Sep. 20, 2006.

(51) Int. Cl.
*G01V 3/08* (2006.01)
*G01V 3/10* (2006.01)

(52) U.S. Cl. .......................................... 324/339; 324/338

(58) Field of Classification Search ................. 324/303, 324/332, 333, 334, 337, 338, 339, 343, 344
See application file for complete search history.

(56) References Cited

U.S. PATENT DOCUMENTS

| | | | |
|---|---|---|---|
| 3,377,549 A | 4/1968 | Newman et al. | |
| 4,968,940 A | 11/1990 | Clark et al. | |
| 5,280,243 A | 1/1994 | Miller | |
| 5,530,358 A | 6/1996 | Wisler et al. | |
| 5,661,402 A * | 8/1997 | Chesnutt et al. | 324/338 |
| 5,892,361 A | 4/1999 | Meyer, Jr. et al. | |
| 6,163,155 A | 12/2000 | Bittar | |
| 6,218,842 B1 | 4/2001 | Bittar et al. | |
| 6,366,089 B1 | 4/2002 | Poitzsch et al. | |
| 6,646,441 B2 * | 11/2003 | Thompson et al. | 324/338 |
| 6,690,170 B2 * | 2/2004 | Homan et al. | 324/339 |
| 6,703,837 B1 | 3/2004 | Wisler et al. | |
| 6,788,066 B2 | 9/2004 | Wisler et al. | |
| 6,838,876 B2 | 1/2005 | Kruspe et al. | |
| 7,057,392 B2 | 6/2006 | Wang et al. | |
| 7,239,145 B2 | 7/2007 | Homan et al. | |
| 2003/0071626 A1 | 4/2003 | Omeragic et al. | |
| 2003/0085707 A1 | 5/2003 | Minerbo et al. | |
| 2004/0113626 A1 | 6/2004 | Wang et al. | |
| 2005/0141373 A1 | 6/2005 | Kaneshige et al. | |
| 2006/0043973 A1 | 3/2006 | Chen et al. | |
| 2006/0186888 A1 | 8/2006 | Wang et al. | |
| 2007/0035305 A1 | 2/2007 | Itskovich et al. | |

FOREIGN PATENT DOCUMENTS

WO   WO0121927 A2   3/2001

* cited by examiner

*Primary Examiner*—Kenneth J Whittington
(74) *Attorney, Agent, or Firm*—Cantor Colburn LLP (57) ABSTRACT

The disclosure provides apparatus and method for estimating an electrical property downhole. The apparatus, in one aspect, includes an antenna that comprises a unitary metallic member that has a longitudinal axis and a radial axis, at least one slot made in the metallic member and an electrical conductor over the at least one slot to form an antenna. In one aspect, a high magnetic permeability material may be placed between the electrical conductor and a bottom of the slots. The antenna may be configured to operate as a transmitter for transmitting electromagnetic signals into a formation or a receiver for receiving electromagnetic signals from the formation.

21 Claims, 7 Drawing Sheets

RESISTIVITY TOOLS WITH LOAD-BEARING AZIMUTHALLY SENSITIVE ANTENNAS AND METHODS OF USING SAME

CROSS-REFERENCE TO RELATED APPLICATIONS

This application takes priority from U.S. Provisional Application Ser. No. 60/845,926 filed on Sep. 20, 2006.

BACKGROUND

1. Field of the Disclosure

This disclosure relates generally to the field of electrical resistivity well logging systems, tools and methods.

2. Description of the Related Art

Wellbores or boreholes for producing hydrocarbons (such as oil and gas) are drilled using a drill string that includes a tubing made up of jointed tubulars or a continuous coiled tubing that has a drilling assembly, also referred to as the bottom hole assembly (BHA), attached to its bottom end. The BHA typically includes a number of sensors, formation evaluation tools, and directional drilling tools. A drill bit attached to the BHA is rotated with a drilling motor in the BHA and/or by rotating the drill string to drill the wellbore. An electromagnetic wave propagation logging tool for determining electrical properties of the formations surrounding the borehole is often deployed in the BHA. Such tools are generally referred to in the oil and gas industry as the resistivity tools. These logging tools make measurements of apparent resistivity (or conductivity) of the formation that, properly interpreted, provide information about the petrophysical properties of the formation surrounding the borehole and fluids contained therein. Resistivity logging tools also are commonly used for logging wells after the wells have been drilled. Such tools are typically conveyed into the wells by wireline. The tools that use wireline are generally referred to as the wireline resistivity tools, while the logging tools used during drilling of the wellbore are generally referred to a the logging-while-drilling (LWD) or measurement-while-drilling (MWD) tools. These resistivity logging tools also are referred to as induction logging tools. For the purpose of this disclosure, the term resistivity tool or induction logging tool is meant to include all such and other versions of the resistivity tools.

A typical resistivity tool includes one or more receiver coils or antennas spaced from each other and one or more transmitter coils or antennas. Alternating current is passed through the transmitter coil, which induces alternating electromagnetic fields in the earth formation surrounding the wellbore. Voltages are induced in the receiver coils as a result of electromagnetic induction phenomena related to the alternating electromagnetic fields in the formation.

LWD resistivity tools, for the most part, make omni-directional measurements. The portion of the formation that affects the signals typically takes the shape of a torus. The antenna configuration used in these tools usually includes a number of axial slots (along a longitudinal axis of the tool and the wellbore) made in the tool body. An antenna wire loop is made by placing a wire (electrical conductor) over the slots, perpendicular to the tool longitudinal axis. The longitudinal tool axis is also referred to as the "tool axis." A ferrite material is often placed in the slots below the wire to increase the sensitivity of such antennas. Resistivity tools also have been developed that are sensitive to the azimuthal direction of a resistivity contrast within the depth of investigation of the tool. In such tools, the antenna wire is not perpendicular to the tool axis. Therefore, the slots for the placement of the ferrite material for such antennas are also not oriented along the tool axis. Such slots are tilted relative to the tool axis and in an extreme case are formed perpendicular to the tool axis, i.e., along the radial direction of the tool body or a housing. These slots are in the form of continuous notches made in the metallic housing. These slots are in the form of continuous notches made in the metallic housing. However, continuous slots made into a section of an LWD resistivity tool body, such as in a section of a drill collar, reduce mechanical strength of the tool body, which can result in developing cracks when the tool body is subjected to high bending loads during drilling of a wellbore.

The disclosure herein provides improved tools, system and methods for estimating or determining an electrical property downhole.

SUMMARY

The present disclosure provides a resistivity tool for use in wellbore operations that includes an elongated housing or a tool body. One or more antennas are placed at selected locations in the tool body. In one configuration, the antenna includes a plurality of rows along the tool axis, each row having at least one slot made in a continuous or unitary metallic carrier or housing, which is mounted on an outside of the tool body. A wire is placed over the slots in each row that is not perpendicular to the tool axis (or non-parallel to the longitudinal tool axis). In one aspect, a high magnetic permeability element or material is placed in each slot. In another aspect, the antenna includes at least two groups or sets of slots placed spaced apart from each other, each set having at least two rows of slots. One or more wires are placed over the slots to form a loop antenna. The antenna may be used as a transmitter or receiver.

In another aspect, a method for estimating a property of interest is disclosed that includes: transmitting electromagnetic signals into a formation; receiving signals from the formation responsive to the transmitted electromagnetic signals by a receiver; wherein at least the receiver or transmitter includes a loop antenna that comprises: a continuous axis-symmetric metallic member mounted on an outside of a tool body; at least two spaced apart groups or sets of slots formed in the metallic member, each group of slots containing at least two rows, each row having at least one slot; and an electrical conductor placed over at least one slot of each row so that the electrical conductor is at not perpendicular to a longitudinal axis of the metallic member; processing the signals received by the receiver to estimate the property of interest; and recording the estimated property of interest in a suitable storage medium.

Examples of the more important features of the apparatus and method for estimating an electrical property of interest downhole have been summarized rather broadly in order that the detailed description thereof that follows may be better understood. There are, of course, additional features of the apparatus and method that will be described hereinafter and which will form the subject of the claims appended hereto. An abstract is provided herein to satisfy certain regulatory requirements. The summary and the abstract are not intended to limit the scope of any claim in this application or an application that may take priority from this application.

BRIEF DESCRIPTION OF THE DRAWINGS

The various features, characteristics and operations of the resistivity tools and methods of using the same disclosed herein will be better understood from the following detailed description and the appended drawings in which like elements are generally designated by like numerals, wherein.

DETAILED DESCRIPTION

Figure 1:
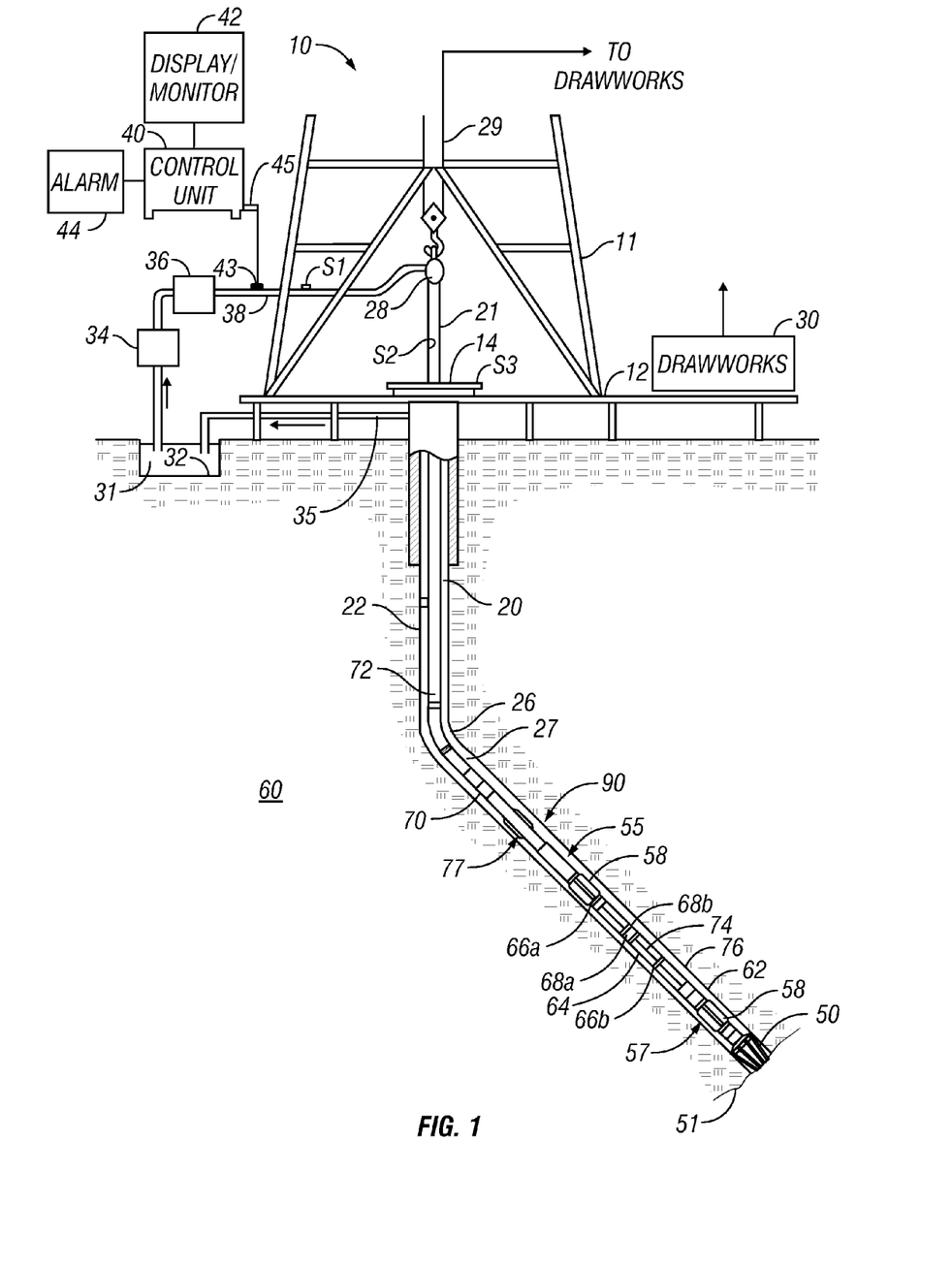
FIG. 1 shows a schematic diagram of an exemplary drilling system having a drill string containing a drilling assembly that includes a resistivity tool made according to one if the embodiments of the present disclosure.

FIG. 1 shows a schematic diagram of a drilling system 10 that includes a drill string 20 having a drilling assembly 90, also referred to as a bottomhole assembly (BHA), conveyed in a borehole 26 penetrating an earth formation 60. The drilling system 10 includes a conventional derrick 11 erected on a floor 12 that supports a rotary table 14 that is rotated by a prime mover, such as an electric motor (not shown), at a desired rotational speed. The drill string 20 includes a drilling tubular 22, such as a drill pipe, extending downward from the rotary table 14 into the borehole 26. A drill bit 50, attached to the end of the BHA 90, disintegrates the geological formations when it is rotated to drill the borehole 26. The drill string 20 is coupled to a drawworks 30 via a kelly joint 21, swivel 28 and line 29 through a pulley 23. During the drilling operations, the drawworks 30 is operated to control the weight on bit, which affects the rate of penetration. The operation of the drawworks 30 is well known in the art and is thus not described in detail herein.

During drilling operations a suitable drilling fluid 31 (also referred to as the "mud") from a source or mud pit 32 is circulated under pressure through the drill string 20 by a mud pump 34. The drilling fluid 31 passes into the drill string 20 via a desurger 36, fluid line 38 and the kelly joint 21. The drilling fluid 31 is discharged at the borehole bottom 51 through an opening in the drill bit 50. The drilling fluid 31 circulates uphole through the annular space 27 between the drill string 20 and the borehole 26 and returns to the mud pit 32 via a return line 35. A sensor S1 in the line 38 provides information about the fluid flow rate. A surface torque sensor S2 and a sensor S3 associated with the drill string 20 respectively provide information about the torque and the rotational speed of the drill string. Additionally, one or more sensors (not shown) associated with line 29 are used to provide the hook load of the drill string 20 and about other desired parameters relating to the drilling of the wellbore 26.

In some applications the drill bit 50 is rotated by only rotating the drill pipe 22. However, in other applications, a drilling motor 55 (mud motor) disposed in the drilling assembly 90 is used to rotate the drill bit 50 and/or to superimpose or supplement the rotation of the drill string 20. In either case, the rate of penetration (ROP) of the drill bit 50 into the borehole 26 for a given formation and a drilling assembly largely depends upon the weight on bit and the drill bit rotational speed.

In one aspect of the embodiment of FIG. 1, the mud motor 55 is coupled to the drill bit 50 via a drive shaft (not shown) disposed in a bearing assembly 57. The mud motor 55 rotates the drill bit 50 when the drilling fluid 31 passes through the mud motor 55 under pressure. The bearing assembly 57 supports the radial and axial forces of the drill bit 50, the downthrust of the drilling motor and the reactive upward loading from the applied weight on bit. Stabilizers 58 coupled to the bearing assembly 57 and other suitable locations act as centralizers for the lowermost portion of the mud motor assembly and other such suitable locations.

A surface control unit 40 receives signals from the downhole sensors and devices via a sensor 43 placed in the fluid line 38 as well as from sensors S1, S2, S3, hook load sensors and any other sensors used in the system and processes such signals according to programmed instructions provided to the surface control unit 40. The surface control unit 40 displays desired drilling parameters and other information on a display/monitor 42 for use by an operator at the rig site to control the drilling operations. The surface control unit 40 contains a computer, memory for storing data, computer programs, models and algorithms accessible to a processor in the computer, a recorder, such as tape unit for recording data and other peripherals. The surface control unit 40 also may include simulation models for use by the computer to processes data according to programmed instructions. The control unit responds to user commands entered through a suitable device, such as a keyboard. The control unit 40 is adapted to activate alarms 44 when certain unsafe or undesirable operating conditions occur.

Referring back to FIG. 1, drilling assembly 90 also contains other sensors and devices or tools for providing a variety of measurements relating to the formation surrounding the borehole and for drilling the wellbore 26 along a desired path. Such devices may include a device for measuring the formation resistivity near and/or in front of the drill bit, a gamma ray device for measuring the formation gamma ray intensity and devices for determining the inclination, azimuth and position of the drill string. A formation resistivity tool 64, made according an embodiment described herein may be coupled at any suitable location, including above a lower kick-off subassembly 62, for estimating or determining the resistivity of the formation near or in front of the drill bit 50 or at other suitable locations. An inclinometer 74 and a gamma ray device 76 may be suitably placed for respectively determining the inclination of the BHA and the formation gamma ray intensity. Any suitable inclinometer and gamma ray device may be utilized. In addition, an azimuth device (not shown), such as a magnetometer or a gyroscopic device, may be utilized to determine the drill string azimuth. Such devices are known in the art and therefore are not described in detail herein. In the above-described exemplary configuration, the mud motor 55 transfers power to the drill bit 50 via a hollow shaft that also enables the drilling fluid to pass from the mud motor 55 to the drill bit 50. In an alternative embodiment of the drill string 20, the mud motor 55 may be coupled below the resistivity measuring device 64 or at any other suitable place.

Still referring to FIG. 1, other logging-while-drilling (LWD) devices (generally denoted herein by numeral 77), such as devices for measuring formation porosity, permeability, density, rock properties, fluid properties, etc. may be placed at suitable locations in the drilling assembly 90 for providing information useful for evaluating the subsurface formations along borehole 26. Such devices may include, but are not limited to, acoustic tools, nuclear tools, nuclear magnetic resonance tools and formation testing and sampling tools.

The above-noted devices transmit data to a downhole telemetry system 72, which in turn transmits the received data uphole to the surface control unit 40. The downhole telemetry system 72 also receives signals and data from the surface control unit 40 and transmits such received signals and data to the appropriate downhole devices. In one aspect, a mud pulse telemetry system may be used to communicate data between the downhole sensors and devices and the surface equipment during drilling operations. A transducer 43 placed in the mud supply line 38 detects the mud pulses responsive to the data transmitted by the downhole telemetry 72. Transducer 43 generates electrical signals in response to the mud pressure variations and transmits such signals via a conductor 45 to the surface control unit 40. In other aspects, any other suitable telemetry system may be used for two-way data communication between the surface and the BHA 90, including but not limited to, an acoustic telemetry system, an electromagnetic telemetry system, a wireless telemetry system that may utilize repeaters in the drill string or the wellbore and a wired pipe. The wired pipe may be made up by joining drill pipe sections, wherein each pipe section includes a data communication link that runs along the pipe. The data connection between the pipe sections may be made by any suitable method, including but not limited to, hard electrical or optical connections and induction methods. In case a coiled-tubing is used as the drill pipe 22, the data communication link may be run along a side of the coiled-tubing.

The drilling system described thus far relates to those drilling systems that utilize a drill pipe to conveying the drilling assembly 90 into the borehole 26, wherein the weight on bit is controlled from the surface, typically by controlling the operation of the drawworks. However, a large number of the current drilling systems, especially for drilling highly deviated and horizontal wellbores, utilize coiled-tubing for conveying the drilling assembly downhole. In such application a thruster is sometimes deployed in the drill string to provide the desired force on the drill bit. Also, when coiled-tubing is utilized, the tubing is not rotated by a rotary table but instead it is injected into the wellbore by a suitable injector while the downhole motor, such as mud motor 55, rotates the drill bit 50. For offshore drilling, an offshore rig or a vessel is used to support the drilling equipment, including the drill string.

Still referring to FIG. 1, a resistivity tool 64 made according to the present disclosure may include a plurality of antennas, at least one such antenna being an azimuthally sensitive antenna made according to an embodiment of the present disclosure, as described in more detail with respect to FIGS. 3-8. An azimuthally sensitive antenna made according to the present disclosure may be configured to operate as a transmitter antenna, such as the transmitter 766a or 66b or as a receiver antenna, such as the receiver 68a or 68b.

Figure 2:
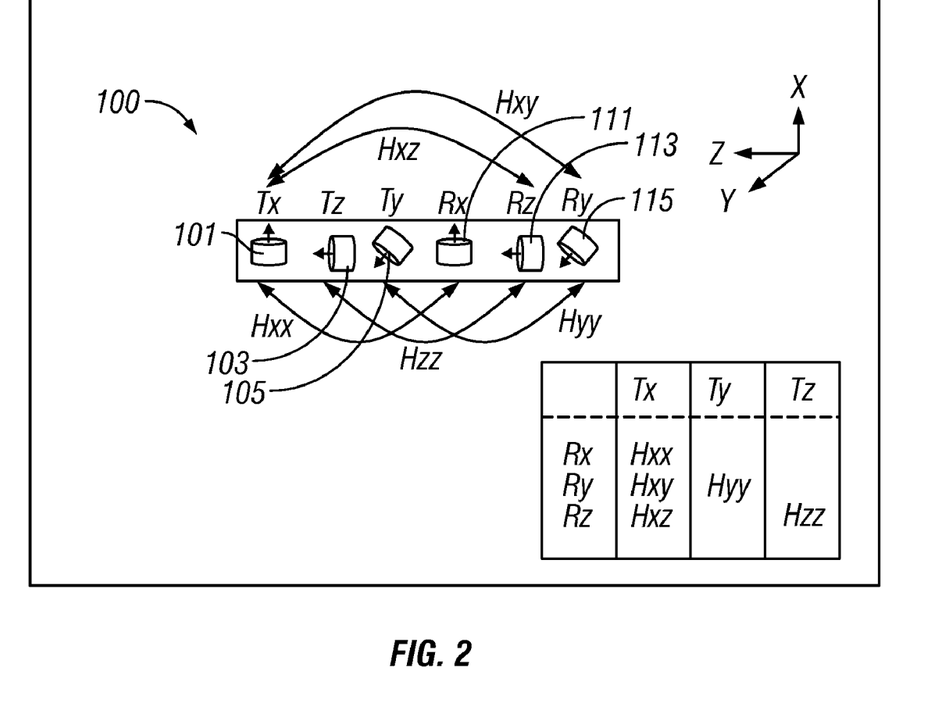
FIG. 2 shows an exemplary configuration of an antenna made according to one aspect of the disclosure for use in a multi-component resistivity tool.

FIG. 2 shows an exemplary configuration of transmitters and receivers of a multi-component resistivity tool 100 that include azimuthally sensitive x and y transverse antennas. The tool 100 is shown to include three orthogonal transmitters 101, 103, and 105, referred to as the $T_x$, $T_z$, and $T_y$ transmitters, which are placed spaced apart on the tool. The subscripts (x, y, z) indicate an orthogonal system that is defined by the directions of the normals to the transmitters. The z-axis is chosen to be along the longitudinal axis of the tool, while the x-axis and y-axis are mutually perpendicular and lying in the planes transverse to the tool axis. The three transmitters 101, 103 and 105, referred to as $T_x$, $T_y$ and $T_z$ transmitters respectively, induce magnetic fields in three spatial directions. Corresponding to each transmitter 101, 103, and 105 are associated receivers 111, 113, and 115, referred to as the $R_x$, $R_z$, and $R_y$ receivers respectively, aligned along the orthogonal system defined by the transmitter normals x, y and z and placed in the order shown in FIG. 1. Receivers $R_x$, $R_z$, and $R_y$ measure the corresponding magnetic fields $H_{xx}$, $H_{zz}$, and $H_{yy}$ generated by the transmitters $T_x$, $T_z$, and $T_y$ respectively. Within this system of magnetic fields, the first index or subscript indicates the direction of the transmitter and the second index indicates the direction of the receiver. In addition, the receivers $R_y$ and $R_z$, measure two cross-components, $H_{xy}$ and $H_{xz}$, of the magnetic fields produced by the $T_x$ transmitter (101).

The orientation of the transmitters and receivers remains fixed with respect to the tool axis. The multi-component tool in horizontal configuration is sensitive to the anisotropic formation, tool location as well as the rotation of the tool around its axis. In the configuration of FIG. 2, the x and y antennas are azimuthally sensitive. Typically, only the $H_{zz}$ component is insensitive to the tool rotation. In the horizontal configuration, the average $(H_{xx}+H_{yy})/2$ is independent of tool rotation. The $H_{zz}$ and $(H_{xx}+H_{yy})/2$ measurements are dependent on the formation and the tool location and thus can be used to determine the distance from the bed boundaries and for geo-steering of the BHA. Also, each transmitters may be operated at any frequency within a range of frequencies, such as between 50 kHz-2 MHz. The configuration shown in FIG. 2 provides just one possible placement of transmitters and receivers. The transmitters and receivers, however, may be placed in any suitable manner. Also, two or more antennas may be placed at the same or substantially the same location on the tool, such as by stacking the antennas at a common location or by placing slots one antenna between or adjacent the slots of another antenna at the same or substantially the same axial and radial location.

According to one aspect of the disclosure, a groove design is provided for building a coil, such as an x-coil (used as transmitter or receiver), for use in an MWD during drilling of a wellbore, such as shown in FIG. 1. Such a design can enable, for example, the x-coil to radiate/detect transverse magnetic fields and protect the x-coil wire from damages posed by the drilling operations. Certain configurations and methods of making coils are described in more detail in reference to FIGS. 3-8. Such coils can efficiently detect the formation signals and also stands up to the mechanical stresses induced during the drilling operations.

Figure 3:
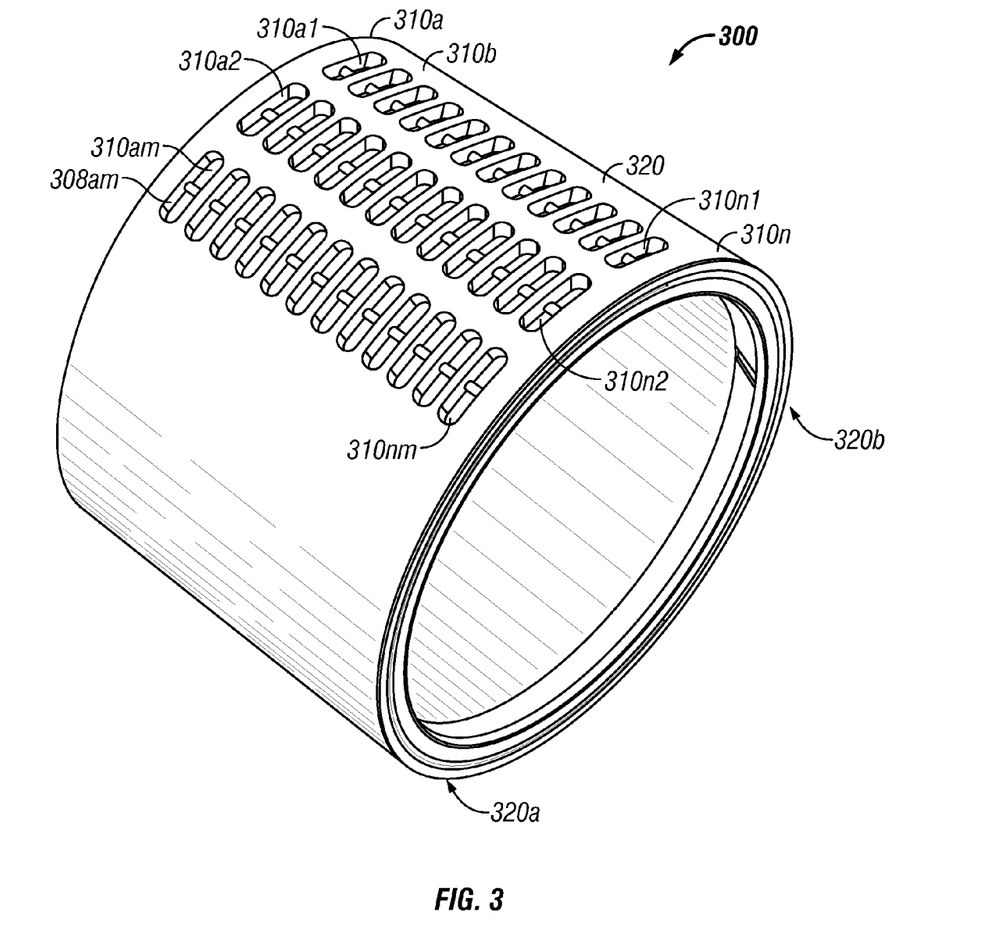
FIG. 3 shows a perspective view of an antenna carrier housing that has slots made for an azimuthally sensitive transverse antenna according to one embodiment of the disclosure.

FIG. 3 shows a perspective view of an antenna carrier 300 that includes a metallic carrier 320 (also referred to herein as a housing, sleeve or metallic member). The antenna configuration shown in FIG. 3 is of an x-transverse antenna, in which circumferential notches made in the metallic member 320 are divided or segmented into slots, each slot containing a suitable high magnetic permeability material, such as a ferrite material of a suitable size. As shown in FIG. 3, the first notch 310a is made up of an array of a plurality ("m") of spaced apart slots, such as slots 310a1 through 310am, while the last notch 310n is made up of "m" slots 310n1 through 310nm. In the example of FIG. 3, each notch is made in the direction perpendicular to the tool axis ("z-axis), i.e., along the radial direction of the carrier 320. Similarly, each of the other notches, such as notch 310b through 310n-1, is made up of similar number of slots formed in the radial direction. Thus, in the example of FIG. 3, the antenna includes multiple notches, each containing three slots. In the configuration of FIG. 3, the slots 310a1 through 310n1 (i.e., one slot from each notch along a common direction, which in this particular case is the z-direction) form a first row of slots belonging to the set of slots shown. Similarly slots 310a2 through 310n2 and 310am through 310nm, each respectively forms the second and third rows of slots. The number of notches, slots and rows contained in each antenna is a design choice and thus may vary from one design to another. In the particular example of FIG. 3, a similar set of notches is made on substantially the opposite side (i.e., about 180 degrees) on the housing 320, as shown and described in reference to FIG. 4. In one aspect, each of the slots may include a ferrite member or material, such as ferrite member 308am in the slot 310am. Wires are routed or placed in the slots along the tool axis direction to form an antenna loop as shown and described in reference to FIGS. 5-8. Although the notches 310a-310m in FIG. 3 are shown made perpendicular to the tool axis (z-axis), such notches may be made in any suitable direction that is not parallel to the tool axis for use as an azimuthally-sensitive coil. Thus, in one aspect, an azimuthally-sensitive antenna according to one aspect of the disclosure may include at least one notch that is made up of (or segmented into) at least two rows, each such row containing at least one slot. For example, the antenna may include one notch 310a and two rows, one row defined by each of the slots 310a1 and 310a2.

Still referring to FIG. 3, each slot further may include a ferrite or another suitable element, such as element 308am, shown placed in slot 310am to provide a low reluctance path for magnetic field created by or detected by the antenna wire. In one aspect, the magnetic material may be a high magnetic permeability material, which may include, but is not limited to: (i) a soft magnetic ferrite material; (ii) an electrically-conductive soft magnetic amorphous alloy; (iii) an electrically-conductive nanocrystalline soft magnetic alloy; (iv) a stack made of soft magnetic amorphous alloy; (v) a stack made of a nanocrystalline soft magnetic alloy; (vi) a soft magnetic iron powder containing at least one of an organic and an inorganic binder; (vii) a soft magnetic sendust containing at least one of an organic and an inorganic binder; and (viii) a soft magnetic nickel iron alloy powder containing at least one of an organic and an inorganic binder. The wire loop is formed by routing one or more wires along in the direction that is not perpendicular to the tool axis to form an antenna loop. The antenna in other configurations may include a plurality of notches, each made up of segmented slots to form rows of slots, each such row including a plurality of slots and corresponding low reluctance elements, wherein one or more wires placed over the slots in a direction that is not perpendicular to the tool axis forms a loop antenna.

Figure 4:
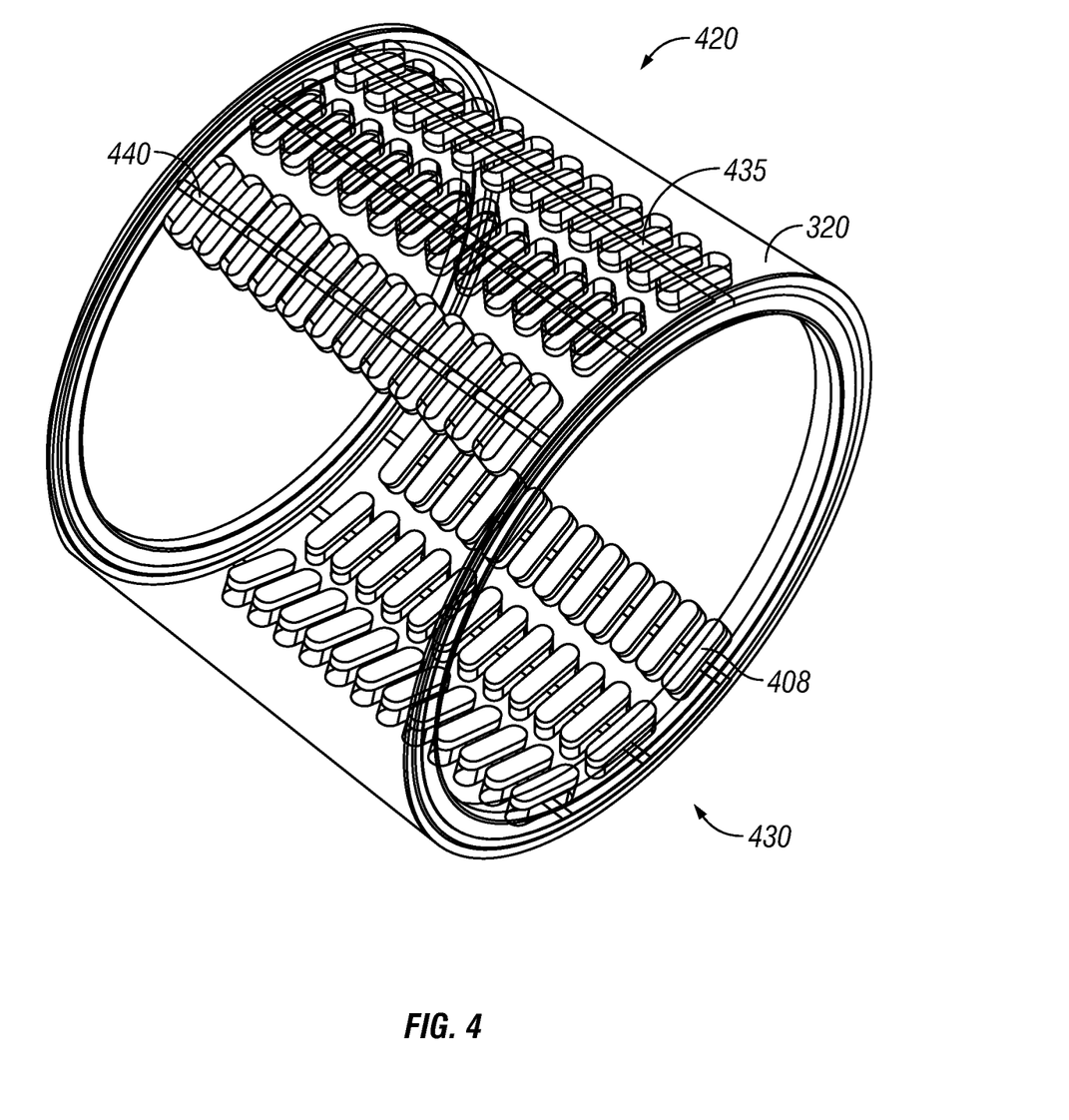
FIG. 4 shows a transparent perspective view of the antenna carrier of FIG. 3 showing the routing of wires over a plurality of rows of two sets of slots made on substantially opposite sides of the carrier housing to form a loop antenna.

FIG. 4 shows a transparent perspective view of the antenna carrier assembly of FIG. 3 showing the placement of wires over the ferrite or the high magnetic permeability elements along the rows of slots according to one aspect of the disclosure. The antenna carrier assembly is shown to include two sets or groups of slots 420 and 430 on the opposite sides of the tubular member 320. Each slot is shown to house or contain a ferrite or another high magnetic permeability member, such as element 408. One or more wires (such as a wire 435) may be routed or placed over the high magnetic permeability material through holes 440 made in the metallic portions of the sleeve between the slots. The wire 435 is shown routed or placed along the remaining rows of slots in a similar manner. In this manner, there exists a small gap or spacing between the wire and the ferrite element, which tends to increase the sensitivity of the antenna.

Figure 5:
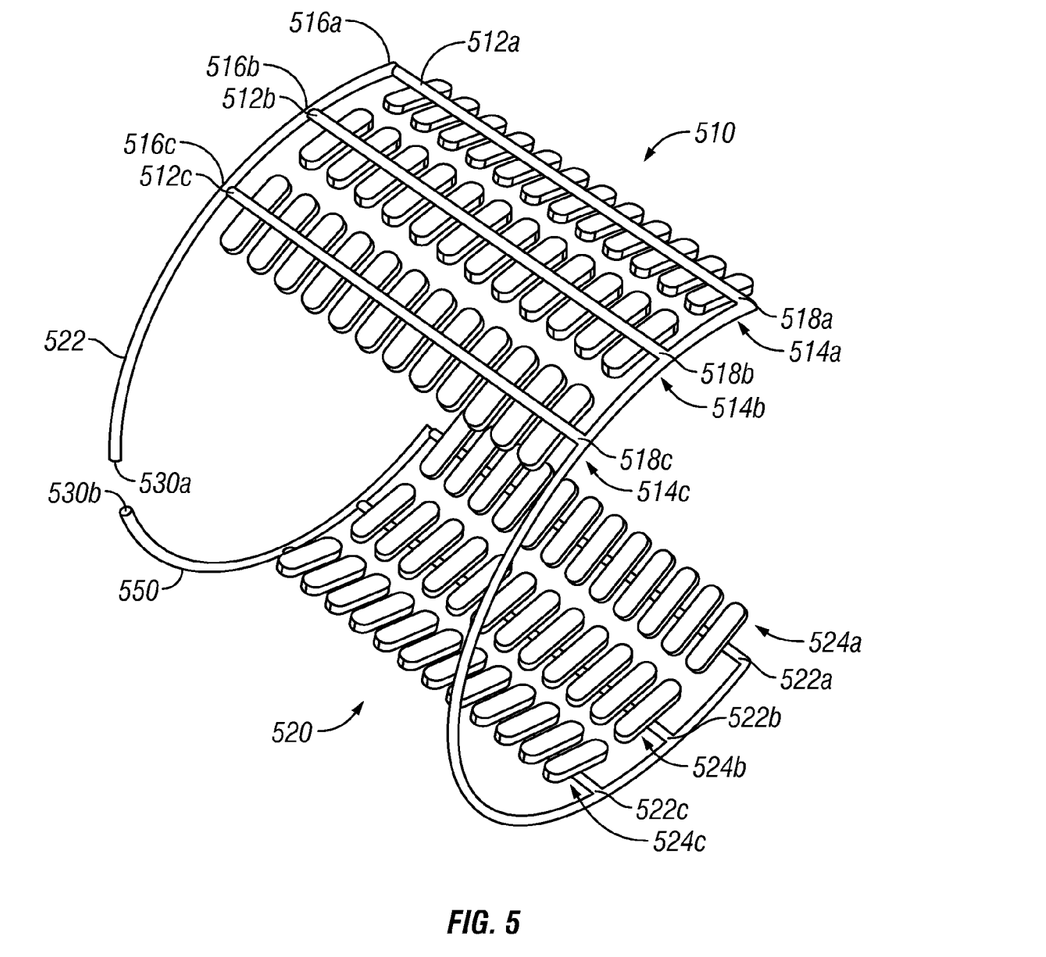
FIG. 5 shows a perspective view of a layout of high magnetic permeability members for placement in the slots shown in FIG. 4 and placement of parallel electrical conductors over the slots to form a loop antenna, according to one particular embodiment of the disclosure.

FIG. 5 shows a partial perspective view of the layout of the rows of the ferrite or other high magnetic permeability members corresponding to the rows of the slots of FIG. 4 and a parallel method of routing the wires to form the loop antenna. In this configuration, wire segments 512a, 512b and 512c are respectively placed along the rows 514a, 514b and 514c of the first set 510 of rows of slots. The wires 512a, 512b and 512c are parallel to each other. One end of each such wire is connected to form one end of the loop antenna. For example, the ends 516a, 516b and 516c at one end of the array 510 are connected together with a wire 522 to form one end 530a of the loop antenna 550. The other ends 518a, 518b and 518c of the parallel wires are connected together and looped around the tool housing to the second array of slots 520, where it is connected to one end of each of the parallel wires 522a, 522b and 522c of the parallel wires 524a, 524b and 524c placed along their respective rows of the slots of the second array 520. The other end of the wires 524a, 524b and 524c are connected together to form the second end 530b of the loop antenna 550. As noted earlier, more than one wire may be used for each row. Also, there may be more than two spaced apart sets of rows.

Figure 6:
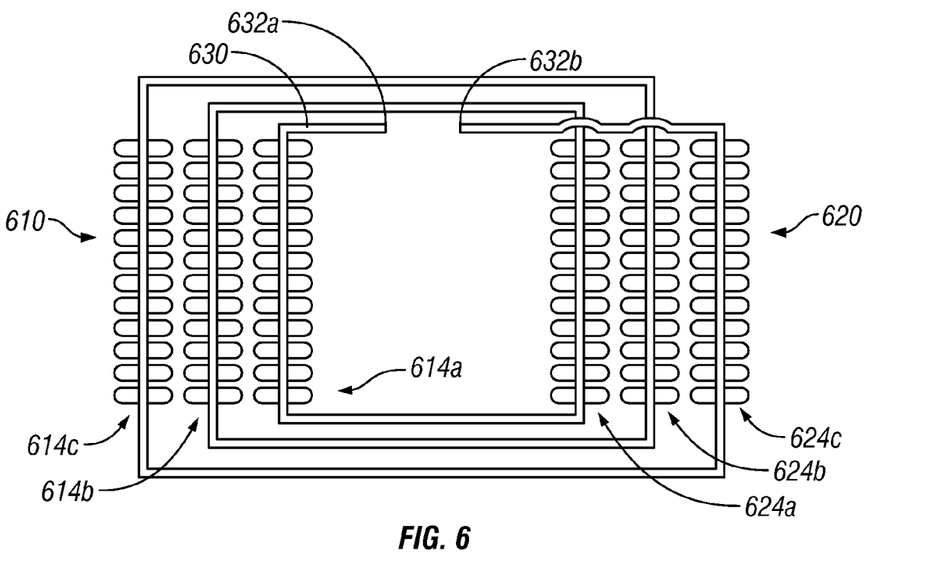
FIG. 6 shows a two-dimensional view of serially routing the wires over the rows of slots to form a loop antenna, according to another particular embodiment of the disclosure.

FIG. 6 shows a two-dimensional view of serial routing of a wire along the rows of two sets of slots, such as shown in FIG. 4, to form a loop antenna, according to one aspect of the disclosure. The configuration of FIG. 6 shows, as an example, a first set of slots 610 containing rows 614a, 614b and 614c of slots and a second set of slots 620, spaced apart from the first set of slots, containing rows 624a, 624b and 624c of slots. Each slot is shown to contain a ferrite or another high magnetic permeability material, such as described in reference to FIG. 3. To form a loop antenna, a wire 630 is placed over the ferrite elements along the first row 614a and then looped around the metallic member or housing and placed over the first row 624a of slots in the second set of slots, which row is closest to the row 614a of slots. The wire 630 leaving the row 624a of slots is then looped over the housing and routed around the tool body and over the second row 614b of the first set 610. The wire 630 is then again routed over the housing and over the second row 624b of slots of the second set 620. The routing of the wire 630 is continued over the third rows 614c and 624c of slots and any additional rows of each set. The wire 630 thus starts at a first end 632a and terminates at an end 632b forming a loop antenna. As noted earlier, the antenna assembly may include any desired number of sets of rows, each row containing any number of slots therein.

Figure 7:
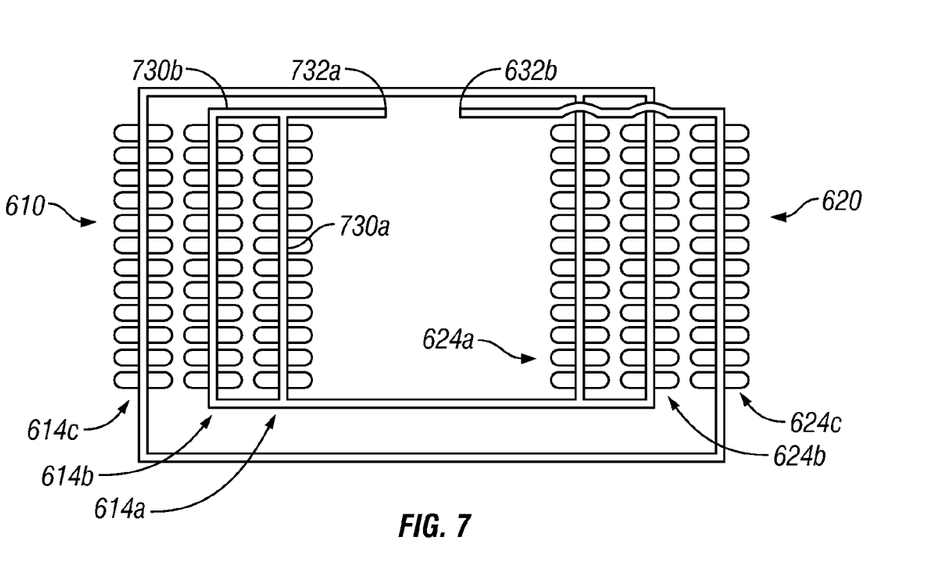
FIG. 7 shows a two-dimensional view showing a combination of serial and parallel routing of the wires to form a loop antenna, according to yet another particular embodiment of the disclosure.

FIG. 7 shows an alternative routing of wires to form a loop antenna for an azimuthally sensitive antenna assembly. In the configuration shown in FIG. 7, the first two rows 614a and 614b of slots of the first set 610 of slots have parallel wires 730a and 730b. These two parallel wires are coupled at their first respective ends that terminate at one end 732a of the loop antenna. The other ends of these wires are coupled and routed over the first two rows 624a and 624b of slots that is connected to the parallel wires along the rows 624a and 624b of the second set 620 of slots. The ends of these parallel wires are coupled and routed over the housing and then over the row 614c of the set 610 of slots and then again over the housing and over the third row 624c of set 620 of slots, terminating at the end 632b. In this manner the first two rows of each set has parallel wires in a manner similar to shown in FIG. 5 and at least one additional row of each set of slots has a serial routing of the wire, similar to the wiring shown in FIG. 6. This configuration, therefore provides a combination of serial and parallel routing of wires over the slots to form a loop antenna. It should be noted that the wiring routings described herein to form a loop antenna are exemplary. Any other suitable routing of one or more wires may be used for the purpose of this disclosure. Furthermore, although the wiring is shown parallel to the tool axis, it may be oriented along any other direction that is not perpendicular (non-orthogonal) to the tool axis. Similarly, the rows of the slots are shown to be parallel to the tool axis. Such rows, however, may be oriented along directions non-parallel to the tool axis.

Figure 8:
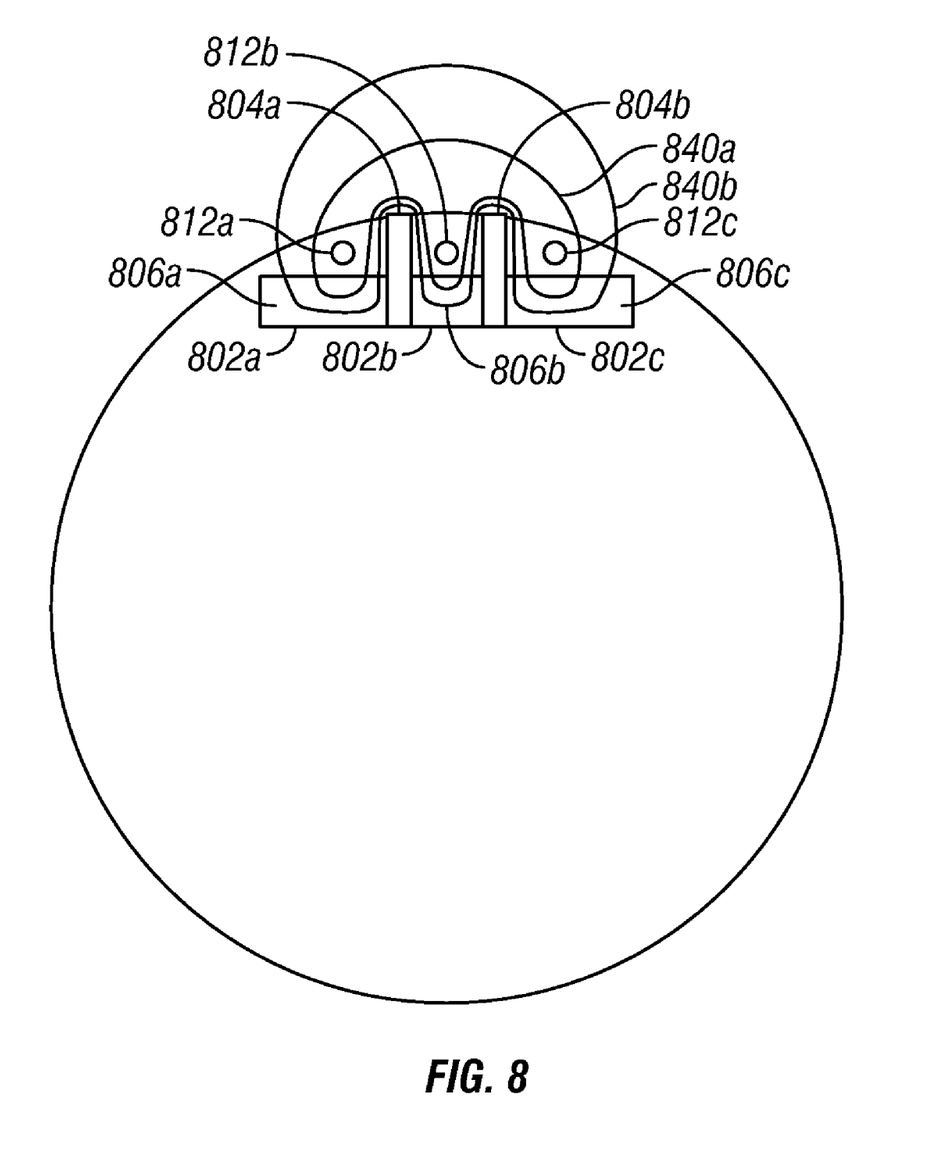
FIG. 8 shows a cross section orthogonal to the tool axis through an antenna formed according to a particular embodiment of the disclosure.

FIG. 8 shows a two-dimensional view of a magnetic field formed for the exemplary configurations of the antenna assembly shown in FIGS. 3-7. FIG. 8 shows a schematic radial cross-sectional view of the tool housing that shows three slots, 802a, 802b and 802c, one from each row of slots. The metal segments between the slots are shown by elements 804a and 804b, while the corresponding ferrite or other high magnetic permeability members are shown by elements 806a, 806b and 806c respectively. The cross-section of the wires placed over each such slot is shown as 812a, 812b and 812c for the slots 802a, 802b and 802c respectively. The magnetic field lines for the loop antenna of FIG. 8 are shown by exemplary lines 840a and 840b. Due to the separation of slots and the ferrite elements, this configuration may be less sensitive compared to a configuration wherein the slots are continuous and include continuous ferrite elements. The antenna made according to this disclosure may be used as a transmitter antenna or a receiver antenna of a resistivity tool. The decrease in sensitivity may be compensated by providing higher current through a transmitter antenna associated with the resistivity tool. The use of higher current generates stronger magnetic fields in the earth formation, which aids the receivers to receive the electromagnetic signals from the formation.

In each of the antennas made according to the disclosure, the metallic carrier, in one aspect, may be a continuous or unitary member of suitable thickness, such as shown in FIGS. 3 and 4. The unitary metallic member may then be placed around a tool body of the resistivity tool and the wire ends connected to appropriate receiver or transmitter circuit as the case may be. The unitary structure having the segmented notches with appropriately selected dimensions is capable of withstanding substantial bending loads on the tool body during drilling of a wellbore. Segmenting the notches with appropriately dimensioned slots allows sufficient metallic material between to remain between the slots to provide the carrier structural strength to withstand substantial bending loads on the drilling assembly portion on which the carrier is mounted. For the purpose of this disclosure, substantial bending load may be thirty percent or more of the bending load on the tool, Typically, the load on the carrier may be between thirty and seventy percent of the load on the tool.

In another configuration, the metallic carrier may be split into two or more longitudinal segments (along the z-direction), such as at locations 320a and 320b (FIG. 3). The two or more segments may then be placed on the outside of the tool body and then coupled together with suitable mechanical coupling elements, such as fasteners, hinges, clamps, screws, bolts, pins, etc. The ferrite elements and the wires may be routed after placing the metallic carrier on the tool body, in the manner described herein. The split carrier structures do not tend to withstand substantial bending loads on the tool body and in such case, the tool body is designed to withstand the necessary bending loads.

The structures and methods described herein may be used in resistivity tools conveyed on a wireline, or as an MWD or LWD resistivity tools conveyed by a drilling tubular. In the resistivity tool, each antenna is coupled to a transmitter or a receiver circuit as the case may be. The transmitter circuit includes an oscillator and other related circuitry that causes its associated antenna to transmit electromagnetic signals at a plurality of frequencies within a range of frequencies. The tool includes a controller that contains a processor, such as a microprocessor, and associated circuits, such as memory and signal processing circuitry, and programmed instruction accessible to the processor for controlling the operation of the transmitter. The receiver circuits include circuits to receive signals detected by the coils, and to amplify and digitize such signals. The controller processes the detected signals according to programmed instructions and provides an estimate of an electrical property of the formation or a downhole fluid. The signals from each receiver may be processed downhole, at the surface or in part downhole in the tool and in part at the surface. The estimated values of the property or properties of interest are recorded or stored in a suitable medium, such as a solid state memory, hard drive, a magnetic tape, etc. The data or results obtained downhole may be transmitted to the surface and/or stored in memory in the tool. The above described circuits are generally known in the art and are thus not described in detail. As noted earlier, two or more antennas may be stacked at the same or substantially the same location on the tool body. Each such antenna may be configured to transmit into and/or receive from the formation electromagnetic radiations at a particular azimuthal direction.

Thus, in one aspect, an apparatus for use in a wellbore for estimating a property of interest is disclosed that may include a tool body and at least one antenna mounted outside the tool body, which antenna further contains a unitary metallic member mounted on an outside of the tool body to carry a substantial portion of the bending load on the tool body during use of the tool in the wellbore. The metallic member has a longitudinal axis and a radial axis orthogonal to the longitudinal axis. In one aspect, slots are made on the metallic member and an electrical conductor placed over the slots forms a loop antenna. In another aspect, at least two spaced apart groups of slots may be formed in the metallic member, each group of slots containing at least two rows of slots, each row having at least one slot. At least one electrical conductor may be placed over at least one slot of each row of slots to form a loop antenna. In one aspect, a segment of the electrical conductor over each row of slots is may be placed at a selected angle relative to the radial axis of the metallic member or placed parallel to the longitudinal axis to form the loop antenna.

In another aspect, a high magnetic permeability material is placed in at least one slot in each row of slots. Any high magnetic permeability material may be used, including but not limited to: (i) a soft ferrite material; (ii) an electrically conductive soft amorphous magnetic alloy; (iii) an electrically conductive nanocrystalline soft magnetic alloy; (iv) a stack made of soft amorphous magnetic alloy; (v) a stack made of a nanocrystalline soft magnetic alloy; (vi) a soft iron powder containing at least one of an organic and an inorganic binder; (vii) a sendust containing at least one of an organic and an inorganic binder; and (viii) a nickel iron alloy powder containing at least one of an organic and an inorganic binder. In one aspect, the electrical conductor is positioned over the high magnetic permeability material via holes formed in the metallic member. The electrical conductor may constitute: (i) a single conductor placed in series over each row of the at least two groups of slots; (ii) at least two electrical conductors connected in parallel over at least two rows of slots; or (iii) at least one electrical conductor connected in series over a first set of at least two parallel rows of slots and at least two electrical conductors connected in parallel over a second set of at least two parallel rows of slots. The apparatus may further include an electrical circuit coupled to the loop antenna to cause the loop antenna to act as a receiver to receive electromagnetic signals from a formation or as a transmitter to transmit electromagnetic waves into the formation. The apparatus may further include a controller that includes a processor configured to process signals received by the loop antenna in the wellbore and to provide an estimate the property of interest, which is one of resistivity and conductivity of a formation surrounding the wellbore. The processor may be located in a downhole portion of the apparatus or at the surface or in part downhole and in part at the surface. The apparatus may further include drilling assembly that carries the loop antenna; and a conveying member that is configured to convey the drilling assembly into the wellbore.

In another aspect, a method for estimating a property of interest is disclosed that includes: transmitting electromagnetic signals into a formation surrounding the wellbore; receiving signals from the formation responsive to the transmitted electromagnetic signals by a receiver; wherein one of the receiver and transmitter includes a loop antenna that includes: a continuous axis-symmetric metallic member mounted on an outside of a tool body; at least two spaced apart groups of slots formed in the metallic member, each group of slots containing at least two rows, each row having at least one slot; and an electrical conductor placed over at least one slot of each row so that the electrical conductor is at not perpendicular to a longitudinal axis of the metallic member; processing the received signals to estimate the property of interest; and recording the estimated property of interest in a suitable storage medium. The method further may include placing a high magnetic permeability material in at least one slot of each row of slots. The method may further include placing a second loop antenna made on a continuous metallic member at substantially the same location where the loop antenna is mounted on the tool body. The method may further include receiving electromagnetic signals by the loop antenna from a first azimuthal direction; receiving additional electromagnetic signals from a second azimuthal direction by an additional loop antenna; processing the signals received from the first and second azimuthal directions to estimate the property of interest. The processing of the signals may be accomplished during one logging of the wellbore by a wireline tool or during logging of the wellbore during drilling of the wellbore. The metallic member may be a sleeve member placed around a portion of the tool body in a manner that subjects the sleeve to substantial bending load on the tool body.

While the foregoing disclosure is directed to certain exemplary embodiments, various modifications will be apparent to those skilled in the art. It is intended that all such modifications be considered as part of the concepts described herein.

The invention claimed is:

1. An apparatus for use in a wellbore for estimating a property of interest, comprising:
   a tool body; and
   at least one antenna mounted outside the tool body, the at least one antenna including:
   a unitary metallic member mounted on an outside of the tool body to carry about 30 percent or more of the bending load on the tool body during use of the tool in the wellbore, the metallic member having a longitudinal axis and a radial axis orthogonal to the longitudinal axis;
   at least one slot formed in the outside surface of the metallic member; and
   at least one electrical conductor placed over the at least one slot to form the at least one antenna.

2. The apparatus of claim 1, wherein at least one slot comprises at least two spaced apart groups of slots, each group of slots containing at least two rows of slots, each row of slots having at least one slot.

3. The apparatus of claim 2, wherein the electrical conductor over each row of slots is not perpendicular to the longitudinal axis.

4. The apparatus of claim 2 further comprising a high magnetic permeability material placed in at least one slot of each row of slots.

5. The apparatus of claim 4, wherein the high magnetic permeability material is selected from a group consisting of: (i) a soft-magnetic ferrite material; (ii) an electrically conductive soft-magnetic amorphous alloy; (iii) an electrically conductive nanocrystalline soft-magnetic alloy; (iv) a stack made of soft-magnetic amorphous alloy; (v) a stack made of a nanocrystalline soft-magnetic alloy; and (vi) a soft-magnetic iron powder containing at least one of an organic and an inorganic binder; (vii) a soft-magnetic sendust containing at least one of an organic and an inorganic binder; and (viii) a soft-magnetic nickel iron alloy powder containing at least one of an organic and an inorganic binder.

6. The apparatus of claim 4, wherein the at least one electrical conductor is positioned over the high magnetic permeability material via holes formed in the metallic member over the slots.

7. The apparatus of claim 2, wherein the at least one electrical conductor constitutes one of: (i) a single conductor placed in series over each row of the at least two groups of slots; (ii) at least two electrical conductors connected in parallel over at least two rows of slots; and (iii) at least one electrical conductor connected in series over a first set of at least two parallel rows of slots and at least two electrical conductors connected in parallel over a second set of at least two parallel rows of slots.

8. The apparatus of claim 2 further comprising a processor configured to process signals received by the loop antenna in the wellbore and to provide an estimate of the property of interest, which is one of resistivity and conductivity of a formation surrounding the wellbore.

9. The apparatus of claim 1 further comprising an electrical circuit coupled to the loop antenna to cause the loop antenna to act as one of a: (i) receiver to receive electromagnetic signals from the formation; and (ii) transmitter to transmit electromagnetic waves into the formation.

10. A method for estimating a property of interest relating to a wellbore, comprising:
    transmitting electromagnetic signals into a formation surrounding the wellbore a transmitter;
    receiving signals from the formation responsive to the transmitted electromagnetic signals by a receiver;
    wherein one of the receiver and transmitter includes a loop antenna that includes:
    a continuous axis-symmetric metallic member mounted on an outside of a tool body;
    at least two spaced-apart groups of slots formed in the metallic member, each group of slots containing at least two rows, each row having at least one slot, wherein the at least two spaced-apart groups of slots are on substantially opposite sides of the metallic member; and an electrical conductor placed over at least one slot of each row so that the electrical conductor is not perpendicular to a longitudinal axis of the metallic member;

processing the received signals to estimate the property of interest; and recording the estimated property of interest in a suitable storage medium.

11. The method of claim 10 further comprising placing a high magnetic permeability material in the slots.

12. The method of claim 10, wherein the high magnetic permeability material is selected from a group consisting of: (i) a soft-magnetic ferrite material; (ii) an electrically conductive soft-magnetic amorphous alloy; (iii) an electrically conductive nanocrystalline soft-magnetic alloy; (iv) a stack made of soft-magnetic amorphous alloy; (v) a stack made of a nanocrystalline soft-magnetic alloy; and (vi) a soft-magnetic iron powder containing at least one of an organic and an inorganic binder; (vii) a soft-magnetic sendust containing at least one of an organic and an inorganic binder; and (viii) a soft-magnetic nickel iron alloy powder containing at least one of an organic and an inorganic binder.

13. The method of claim 10, wherein the metallic member is an axis-symmetric sleeve that is placed around a portion of the tool body in a manner that it is subjected to a substantial bending load when the tool body bends during drilling of the wellbore.

14. The method of claim 10, wherein the receiver includes the loop antenna, the method further comprising:

receiving the electromagnetic signals by the loop antenna from a first azimuthal direction;

receiving additional electromagnetic signals from a second azimuthal direction by an additional loop antenna;

processing the signals received from the first and second azimuthal directions to estimate the property of interest.

15. The method of claim 10, wherein the processing of the signals is accomplished during one of: logging of the wellbore by a wireline tool; and logging of the wellbore during drilling of the wellbore.

16. A loop antenna configured for use in a downhole tool, comprising:

a continuous axis-symmetric metallic sleeve member configured to be mounted on an outside of a tool body of the downhole tool to carry about 30 percent or more of the bending load on the tool body during use of the downhole tool in a wellbore, the metallic member having a longitudinal axis and a radial axis orthogonal to the longitudinal axis;

at least two spaced apart groups of slots formed in the metallic member, each group of slots containing at least two rows of slots, each row having at least one slot; and at least one electrical conductor placed over at least one slot of each row of slots to form a loop antenna.

17. The apparatus of claim 16, wherein the at least one electrical conductor constitutes one of: (i) a single conductor placed in series over each row of the at least two groups of slots; (ii) at least two electrical conductors connected in parallel over at least two rows of slots; and (iii) at least one electrical conductor connected in series over a first set of at least two parallel rows of slots and at least two electrical conductors connected in parallel over a second set of at least two parallel rows of slots.

18. The apparatus of claim 16, wherein a segment of the at least one electrical conductor over each row of slots is placed at an angle relative to the radial direction.

19. The apparatus of claim 18 further comprising a high magnetic permeability material placed in at least one slot in each row of slots.

20. The apparatus of claim 19, wherein the at least one electrical conductor is positioned over the high magnetic permeability material via holes formed in the metallic member.

21. The apparatus of claim 18, wherein the high magnetic permeability material is selected from a group consisting of: (i) a soft ferrite material; (ii) an electrically conductive soft amorphous magnetic alloy; (iii) an electrically conductive nanocrystalline soft magnetic alloy; (iv) a stack made of soft amorphous magnetic alloy; (v) a stack made of a nanocrystalline soft magnetic alloy; (vi) a soft iron powder containing at least one of an organic and an inorganic binder; (vii) a sendust containing at least one of an organic and an inorganic binder; and (viii) a nickel iron alloy powder containing at least one of an organic and an inorganic binder.

* * * * *